(12) United States Patent
Steinert et al.

(10) Patent No.: US 9,690,719 B2
(45) Date of Patent: Jun. 27, 2017

(54) MECHANISM FOR MANAGING ACCESS TO AT LEAST ONE SHARED INTEGRATED PERIPHERAL OF A PROCESSING UNIT AND A METHOD OF OPERATING THEREOF

(71) Applicants: Frank Steinert, Rosenheim (DE); Andrey Kovalev, Sauerlach (DE)

(72) Inventors: Frank Steinert, Rosenheim (DE); Andrey Kovalev, Sauerlach (DE)

(73) Assignee: NXP USA, Inc., Austin, TX (US)

( * ) Notice: Subject to any disclaimer, the term of this patent is extended or adjusted under 35 U.S.C. 154(b) by 366 days.

(21) Appl. No.: 14/483,273

(22) Filed: Sep. 11, 2014

(65) Prior Publication Data

US 2016/0077984 A1  Mar. 17, 2016

(51) Int. Cl.
*G06F 13/36* (2006.01)
*G06F 13/16* (2006.01)
(Continued)

(52) U.S. Cl.
CPC ...... *G06F 13/1642* (2013.01); *G06F 9/45558* (2013.01); *G06F 9/5022* (2013.01); *G06F 13/102* (2013.01); *G06F 2009/45579* (2013.01)

(58) Field of Classification Search
CPC ...... G06F 15/167; G06F 13/385; G06F 15/17; G06F 1/00; G06F 12/0835
(Continued)

(56) References Cited

U.S. PATENT DOCUMENTS 4,890,223 A   12/1989  Cruess et al.
6,292,888 B1*  9/2001  Nemirovsky ....... G06F 9/30123
                                                    710/33
(Continued)

FOREIGN PATENT DOCUMENTS

JP   2003150450   5/2003
JP   2009524140   6/2009
(Continued)

OTHER PUBLICATIONS

Intel: "PCI-SIG Single Root I/O Virtualization (SR-IOV) Support in Intel® Virtualization Technology for Connectivity", Efficient Native Sharing of I/O Devices with Virtual Machines for enhancing I/O Performance, White Paper, Rev. 06/08-001US, 2008, pp. 1-4.
(Continued)

*Primary Examiner* — Tim T Vo
*Assistant Examiner* — Kim T. Huynh (57) ABSTRACT

The present application relates to a mechanism for managing access to at least one shared integrated peripheral of a processing unit and a method of operating thereof. The mechanism is operative in an available state and a locked state. The mechanism comprises at least one context register and a bus interface for receiving a request. A filtering unit obtains information relating to a context of the received request. If in the available state, a managing unit loads the context register with the obtained context information; and grants access in response to the received request. If in the locked state, the managing unit detects whether the obtained context information matches with the context information stored in the context register; and if the obtained and stored context information match, grants access in response to the received request. Otherwise, access is denied.

20 Claims, 7 Drawing Sheets

(51) Int. Cl.
*G06F 9/50* (2006.01)
*G06F 9/455* (2006.01)
*G06F 13/10* (2006.01)

(58) Field of Classification Search
USPC .................. 710/308, 260–269, 200, 305–306
See application file for complete search history.

(56) References Cited

U.S. PATENT DOCUMENTS

| | | | |
|---|---|---|---|
| 6,775,750 B2 | 8/2004 | Krueger | |
| 6,981,149 B1 | 12/2005 | Housley et al. | |
| 7,107,382 B2 | 9/2006 | Clayton | |
| 7,478,178 B2 | 1/2009 | Torudbakken et al. | |
| 7,521,761 B2 | 4/2009 | Satsukawa | |
| 7,543,126 B2 | 6/2009 | Lewis | |
| 7,558,923 B1 | 7/2009 | Bennett et al. | |
| 7,710,758 B2 | 5/2010 | Jo | |
| 7,793,345 B2 | 9/2010 | Weber et al. | |
| 7,921,431 B2 | 4/2011 | Smart | |
| 7,996,593 B2 | 8/2011 | Blackmore et al. | |
| 7,996,836 B1 | 8/2011 | McCorkendale et al. | |
| 8,036,243 B2 | 10/2011 | Georgiou et al. | |
| 8,069,325 B2 | 11/2011 | Vermeulen et al. | |
| 8,135,962 B2 | 3/2012 | Strongin et al. | |
| 8,346,997 B2 | 1/2013 | Freimuth et al. | |
| 8,719,526 B2 | 5/2014 | Chen et al. | |
| 8,789,170 B2 | 7/2014 | Sastry et al. | |
| 9,336,411 B2 | 5/2016 | Rohleder et al. | |
| 2004/0199700 A1 | 10/2004 | Clayton | |
| 2005/0091432 A1 | 4/2005 | Adams et al. | |
| 2005/0132365 A1 | 6/2005 | Madukkarumukumana et al. | |
| 2005/0246453 A1 | 11/2005 | Erlingsson et al. | |
| 2006/0041705 A1 | 2/2006 | Bueti et al. | |
| 2006/0075146 A1 | 4/2006 | Schoinas et al. | |
| 2006/0090053 A1 | 4/2006 | Boning | |
| 2006/0123416 A1 | 6/2006 | Bertolotti et al. | |
| 2006/0129747 A1 | 6/2006 | Weber et al. | |
| 2006/0195618 A1 | 8/2006 | Arndt et al. | |
| 2006/0195645 A1 | 8/2006 | Ryan et al. | |
| 2006/0212606 A1 | 9/2006 | Arndt et al. | |
| 2007/0005919 A1 | 1/2007 | Van Riel | |
| 2007/0039045 A1 | 2/2007 | McKee et al. | |
| 2007/0192518 A1* | 8/2007 | Rupanagunta | G06F 13/124 710/62 |
| 2009/0083829 A1 | 3/2009 | Peterson | |
| 2009/0157979 A1 | 6/2009 | Gregg et al. | |
| 2009/0230255 A1 | 9/2009 | Lemonovich et al. | |
| 2009/0275407 A1 | 11/2009 | Singh et al. | |
| 2010/0042759 A1 | 2/2010 | Srinivasan et al. | |
| 2010/0162243 A1 | 6/2010 | Barde et al. | |
| 2010/0180056 A1 | 7/2010 | Matsuse | |
| 2010/0268905 A1 | 10/2010 | Reipold et al. | |
| 2010/0318822 A1 | 12/2010 | Scandurra et al. | |
| 2011/0067114 A1 | 3/2011 | Weber et al. | |
| 2011/0119423 A1 | 5/2011 | Kishore et al. | |
| 2011/0191562 A1 | 8/2011 | Chou et al. | |
| 2012/0079479 A1* | 3/2012 | Hakewill | G06F 9/45558 718/1 |
| 2012/0117301 A1 | 5/2012 | Wingard | |
| 2013/0111168 A1 | 5/2013 | Circello et al. | |
| 2014/0137231 A1 | 5/2014 | Sastry et al. | |
| 2014/0259128 A1 | 9/2014 | Fear | |
| 2016/0028728 A1 | 1/2016 | Hampel et al. | |
| 2016/0156632 A1 | 6/2016 | Rohleder et al. | |
| 2016/0350549 A1 | 12/2016 | Hampel et al. | |

FOREIGN PATENT DOCUMENTS

| | | |
|---|---|---|
| WO | 2014041395 A1 | 3/2014 |
| WO | 2014080247 A1 | 5/2014 |
| WO | 2014080248 A1 | 5/2014 |

OTHER PUBLICATIONS

Fiorin et al. "A data protection unit for NoC-based architectures." Proceedings of the 5th IEEE/ACM international conference on Hardware/software codesign and system synthesis. ACM, 2007.
U.S. Appl. No. 14/422,058, filed Feb. 17, 2015.
Notice of Allowance, U.S. Appl. No. 14/422058, Mar. 29, 2017, 16 pages.
Non-Final Office Action, U.S. Appl. No. 14/422,058, Feb. 3, 2017, 5 pages.
Final Office Action, U.S. Appl. No. 14/647089, Mar. 15, 2017, 40 pages.
Non-Final Office Action, U.S. Appl. No. 14/647,089, Jun. 30, 2016, 31 pages.
U.S. Appl. No. 14/647,089, filed May 23, 2015.
U.S. Appl. No. 14/899,338, filed Dec. 17, 2015.
U.S. Appl. No. 14/442,241, filed May 12, 2015.
Notice of Allowance, U.S. Appl. No. 14/442,241, Jan. 29, 2016, 8 pages.
Non-Final Office Action, U.S. Appl. No. 14/442,241, Nov. 6, 2015, 4 pages.
Non-Final Office Action, U.S. Appl. No. 14/899,338 Apr. 4, 2017, 19 pages.
Notice of Allowance, U.S. Appl. No. 14/422,058, May 5, 2017, 22 pages.

* cited by examiner

MECHANISM FOR MANAGING ACCESS TO AT LEAST ONE SHARED INTEGRATED PERIPHERAL OF A PROCESSING UNIT AND A METHOD OF OPERATING THEREOF

FIELD OF THE INVENTION

The present invention relates generally to the field of computer architecture and, more specifically, to systems and method for managing shared resources in multitasking environments.

BACKGROUND OF THE INVENTION

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever-increasing number of processing elements—cores, hardware threads, and logical processors—on integrated circuits enables more tasks to be accomplished in parallel.

In multitasking environments, in which several applications access in parallel (shared hardware components, precautions have to be made to handle concurrent access issues in order to ensure proper execution of the applications.

Various techniques have been developed to address such issue. In the field of server/desktop systems, "hypervisors" have been introduced to enable use of resources shared among so-called logical partitions. Logical partitions separate a single physical server/desktop system into two or more virtual processing systems, with each virtual processing system able to run independent applications or workloads. Each logical partition acts as an independent virtual processing system, and can share the memory, processors, disks, and other I/O functions of the physical server/desktop system with other logical partitions. A logical partitioning functionality within a physical data processing system (hereinafter also referred to as a "platform") allows for instance multiple copies of a single operating system (OS) or multiple heterogeneous operating systems to be simultaneously run on the single (physical) platform.

The act of creating and managing the partitions, as well as coordinating and managing the I/O functions of the partitions, was delegated to this module which acted as a buffer between the logical partitions and the specific I/O peripherals associated with the platform or system. The logical partitioning functionality (and associated management of the I/O) can typically be embodied in such systems by software layer, referred to generally as "hypervisors". The software hypervisor layer facilitates and mediates the use of the I/O adapters by drivers in the partitions of the logically partitioned platform. For example, I/O operations typically involve access to system memory allocated to logical partitions. The coordinates specifying such memories in I/O requests from different partitions must be translated into a platform-wide consistent view of memory accompanying the I/O requests reaching the IOA. Such a translation (and effectively protection) service is rendered by the hypervisor and will have to be performed for each and every I/O request emanating from all the logical partitions in the platform.

Thus, the I/O requests are necessarily routed through the hypervisor layer. Being software, this of course potentially adds large amounts of overhead in providing the translation and other such mediation functions, since the hypervisor runs on a computing platform, and that platform may also run one or more of the OS images concurrently. Accordingly, running the I/O requests through the software hypervisor layer adds extraneous overhead due to the nature of the solution, and can induce performance bottlenecks.

US 2007/0192518 A1 for instance discloses an apparatus, which allows for managing I/O accesses for host subsystems that share I/O peripherals. Host subsystem ports receive I/O requests from and communicate with the plurality of platforms. A translation circuit, coupled to the host subsystem ports, identifies an I/O request from the host subsystem port as being associated with a particular host subsystem. A plurality of output ports are provided and are coupled to the peripheral I/O devices. A switching element is coupled to the translation circuit and to the output ports, and routes I/O requests to a particular output port. The management circuit manages the use of the output ports and brokers the physical usage of the ports. The apparatus is contained on physical devices distinct from the plurality of platforms.

US 2011/0119423 A1 for instance discloses Input/Output (IO) Virtualization (IOV) system, similar to that of US 2007/0192518 A1, which provides a mechanism for sharing computer peripheral devices or resources between multiple host computers by presenting a single resource multiple times to numerous host systems. Host interfaces are each coupled to one of a number of host computers. Each host interface includes a proxy, and each proxy comprises configuration data.

US 2006/0195618 A1 further discloses a mechanism applicable with an I/O adapter that directly supports adapter virtualization and does not require a hypervisor or other intermediary layer to be invoked on every I/O transaction is provided. The mechanism is provided for directly creating and initializing a virtual adapter and associated resources within a physical adapter. Each virtual adapter has an associated set of host side resources and adapter side resources and each virtual adapter is isolated from accessing the host side resources and adapter side resources that belong to another virtual or physical adapter.

The solutions known in the art require high software overhead and/or complex hardware implementations, which do not meet the constraints of embedded systems having limited processing resources and hardware complexity.

SUMMARY OF THE INVENTION

The invention provides a mechanism for managing access to at least one shared integrated peripheral of a processing unit and a method of operating thereof as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Ele- FIG. 1 schematically illustrates a simplified block diagram of a multi-core system on chip (SoC) with multiple processor cores and shared integrated peripherals according to an example of the present application.

DETAILED DESCRIPTION OF THE PREFERRED EMBODIMENTS

Because the illustrated examples of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

It is understood that the following disclosure provides many different examples capable of implementing different features. Specific examples of components and arrangements are described below to simplify and thus clarify the present disclosure. These are, of course, merely examples and are not intended to be limiting. In many instances, the features of one embodiment may be combined with the features of other embodiments.

Figure 1:
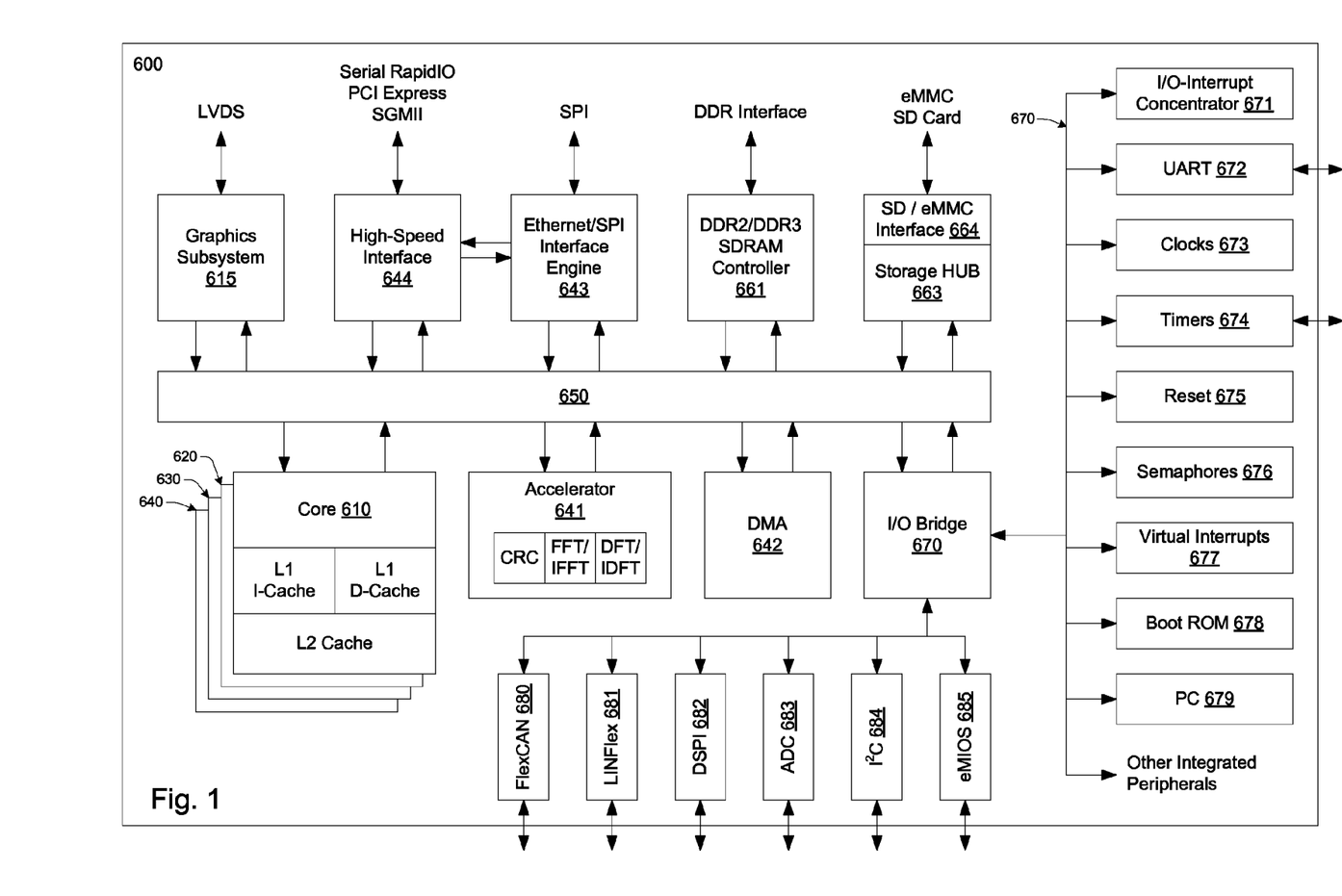

Referring now to FIG. 1, there is shown a simplified schematic diagram of a multi-core system on chip 600 having multiple processor cores 610, 620, 630, and 640. The multi-core system on chip 600 should be understood as one example of a data processing device or a data processing system in the context of the present application. As illustrated, each of the processor cores 610, 620, 630, 640 is coupled to one or more levels of cache memory, such as an L1 instruction cache (I-Cache), L1 data cache (D-Cache), and/or L2 cache. While the processor cores 610, 620, 630, 640 may be identically designed or homogenous, the multi-core SoC may also include one or more cores having a different design. For example, the depicted multi-core SoC 600 also includes an accelerator 641, which may include one or more processor cores for supporting hardware acceleration for DFT/iDFT and FFT/iFFT algorithms and for CRC processing. Each processor core is coupled across an interconnect bus 650 to one or more memory controllers 661, which are coupled in turn to one or more banks of system memory (not shown). The interconnect bus 650 also couples the processor cores to a Direct Memory Access (DMA) controller 642, network interface 643, a high speed serial interface 644, and to other hardware-implemented integrated peripherals 671 to 679. The interconnect bus 650 may be a coherency fabric.

Each of the processor cores 610, 620, 630, 640 may be configured to execute instructions and to process data according to a particular instruction set architecture (ISA), such as x86, PowerPC, SPARC, MIPS, and ARM, for example. Those of ordinary skill in the art also understand the present invention is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each of the processor cores 610, 620, 630, 640 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 600 with four cores will be capable of executing a multiple of four threads in this configuration. However, it should be appreciated that the invention is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 610 and 620), regardless of whether the individual cores are fabricated monolithically (i.e., on the same chip) or separately. Thus, a second core may be the same physical core as first core, but has multiple modes of operation (i.e., a core may be virtualized).

As depicted, each processor core (e.g., 610) may include a first level (L1) cache, which includes a data cache (D-Cache) and an instruction cache (I-Cache). In addition, a second level of cache memory (L2) may also be provided at each core, though the L2 cache memory can also be an external L2 cache memory, which is shared by one or more processor cores. The processor core 610 executes instructions and processes data under control of the operating system (OS) which may designate or select the processor core 610 as the control or master node for controlling the workload distribution amongst the processor cores 610, 620, 630, 640. Communication between the cores 610, 620, 630, 640 may be over the interconnect bus 650 or over a crossbar switch and appropriate dual point to point links according to, for example, a split-transaction bus protocol such as the HyperTransport (HT) protocol (not shown). Those skilled in the art will understand that the control functionality may not be exclusively assigned to one of the processor cores 610, 620, 630, 640. The control functionality may be distributed among the processor cores 610, 620, 630, 640.

The processor cores 610, 620, 630, 640 and accelerator 641 are in communication with the interconnect bus 650 which manages data flow between the cores and the memory. The interconnect bus 650 may be configured to concurrently accommodate a large number of independent accesses that are processed on each clock cycle, and enables communication data requests from the processor cores 610, 620, 630, 640 to external memory and/or an on-chip memory (not shown), as well as data responses therefrom. The external memory and/or an on-chip memory may comprise volatile memory technology and/or non-volatile memory technology. In selected embodiments, the interconnect bus 650 may include logic (such as multiplexers or a switch fabric, for example) that allows any core to access any bank of memory, and that conversely allows data to be returned from any memory bank to any core. The interconnect bus 650 may also include logic to queue data requests and/or responses, such that requests and responses may not block other activity while waiting for service. Additionally, the interconnect bus 650 may be configured as a chip-level arbitration and switching system (CLASS) to arbitrate conflicts that may occur when multiple cores attempt to access a memory or vice versa.

The interconnect bus 650 is in communication with main memory controller 661 to provide access to the optional SOC internal memory or main memory (not shown). Memory controller 661 may be configured to manage the transfer of data between the multi-core SoC 600 and system memory, for example. In some embodiments, multiple instances of memory controller 661 may be implemented, with each instance configured to control a respective bank of system memory. Memory controller 661 may be configured to interface to any suitable type of system memory, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 661 may be configured to support interfacing to multiple different types of system memory. In addition, the Direct Memory Access (DMA) controller 642 may be provided which controls the direct data transfers to and from system memory via memory controller 661.

The interconnect bus 650 is in communication with storage HUB 663 to provide access to mass storage (not shown). The storage HUB 663 may be configured to manage the transfer of data between the multi-core SoC 600 and mass storage units, for example. The storage HUB 663 may further include one or more interfaces specific for the technology used by the mass storage units. Herein, the storage HUB 663 is exemplarily illustrated to include a SD/eMMC Interface 664, which is provided to allow for access to SD (Secure Data), MMC (MultiMediaCard) cards (not shown) and/or eMMC (embedded MultiMediaCard) (not shown). Both storage technologies are implemented based on non-volatile flash memory technology. In some embodiments, multiple instances of storage HUB 663 and/or interfaces provided with the storage HUB 663 may be implemented, with each instance configured to control a respective bank of system memory. Memory storage HUB 663 may be configured to interface to any suitable type of mass storage interfacing standards including in particular flash memory storage standards (SD, MMC), SAS (Serial Attached SCSI), SATA (Serial ATA) and the like.

The multi-core SoC 600 may comprise a dedicated graphics sub-system 200. The graphics sub-system 200 may be configured to manage the transfer of data between the multi-core SoC 600 and graphics sub-system 200, for example, through the interconnect bus 650. The graphics sub-system 200 may include one or more processor cores for supporting hardware accelerated graphics generation. The graphics generated by the graphics sub-system 200 may be outputted to one or more displays via any display interface such as LVDS, HDMI, DVI and the like.

As will be appreciated, the multi-core SoC 600 may be configured to receive data from sources other than system memory. To this end, a network interface engine 643 may be configured to provide a central interface for handling Ethernet and SPI interfaces, thus off-loading the tasks from the cores. In addition, a high-speed serial interface 644 may be configured to support one or more serial RapidIO ports, a PCI-Express Controller, and/or a serial Gigabit Media Independent Interface (SGMII). In addition, one or more hardware-integrated peripherals (IP) may be provided which are configured to couple the cores to external boot and/or service devices. The one or more interfaces may be coupled through one or more I/O bridges to the interconnect bus 650 of the SoC 600.

The one or more hardware-integrated peripherals (IP) may include, without being limited thereto: I/O interrupt concentrators 671, UART (universal asynchronous receiver/transmitter) device(s) 672, clock(s) 673, timer(s) 674, reset 675, hardware semaphore(s) 676, virtual interrupt(s) 677, Boot ROM 678, Power Controller (PC) 679, FlexCAN (enhanced CAN; CAN: Controller Area Network) interface 680, LinFlex (Serial Communication; LIN: Local interconnect network) interface 681, DSPI (Deserial Serial Peripheral Interface) 682, analogue-to-digital converter (ADC) 683, I$^2$C (Inter-Integrated Circuit) interface 684, an eMIOS (enhanced Modular Input Output System) 685, GPIO (General-purpose input/output) interface ports, and/or other modules.

Instructions for the operating system, applications, and/or programs may be in mass storage or memory, which are in communication with processor cores 610, 620, 630, 640 through communications fabric 650. In these illustrative examples, the instructions are in a functional form on a non-transitory tangible medium such as a persistent mass storage. These instructions may be loaded into memory for running by processor cores 610, 620, 630, 640. The processes of the different examples may be performed by processor cores 610, 620, 630, 640 using computer-implemented instructions, which may be in a memory. These instructions are referred to as program code, computer usable program code, or computer readable program code that may be read and run by one or more processor cores 610, 620, 630, 640 in the SoC 600. The program code in the different examples may be embodied on different physical or computer readable non-transitory tangible storage media.

Program code may be in a functional form on computer readable medium that may be selectively removable and may be loaded onto or transferred to data processing device for running by the one or more processor cores. Program code and computer readable medium form a computer program product in these examples. In one example, computer readable medium may be computer readable non-transitory tangible storage medium. Computer readable storage medium may include, for example, an optical or magnetic disk that may be inserted or placed into a drive or other device that may be part of persistent storage for transfer onto a mass storage device, such as a hard drive, that may be part of persistent storage. Computer readable storage medium also may take the form of a persistent storage, such as a hard drive, a thumb drive, or a flash memory, that may be operably coupled to data processing device. In some instances, computer readable storage medium may not be removable from data processing device.

Figure 2:
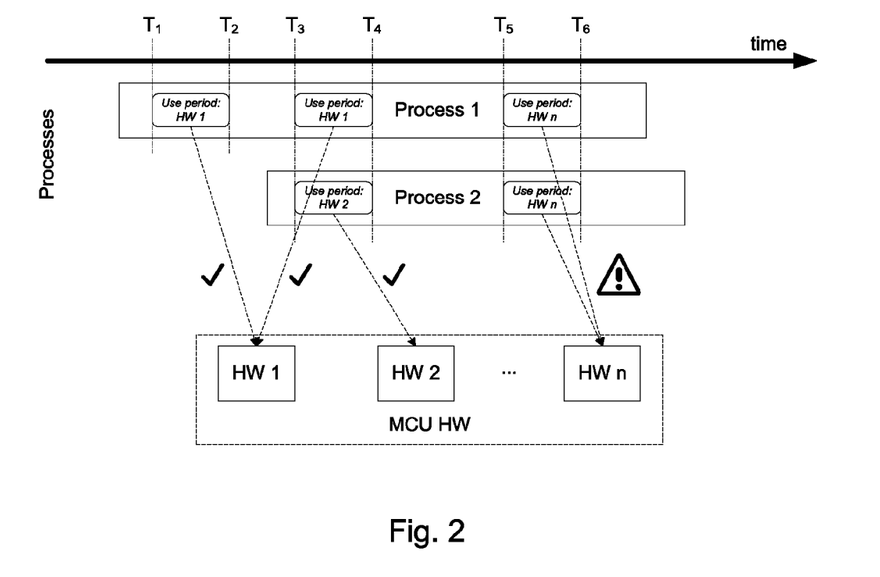
FIGS. 2 and 3 show schematic flow diagrams illustrating two processes executed in a multitasking processing environment on a processing device MCU (microcontroller unit) and accessing shared integrated peripherals according to an example of the present application.
Figure 3:
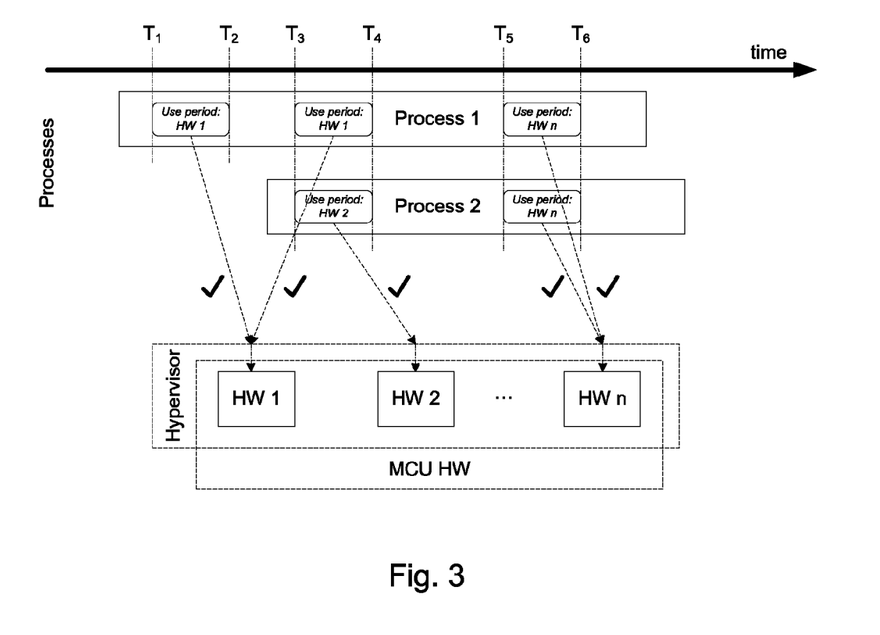

Referring now to FIGS. 2 and 3, the need for the solution presented in the present application will be described with reference to three "use cases" illustrating the issues occurring in multitasking environments sharing resources.

FIG. 2 shows a schematic flow diagram illustrating two processes executed in a multitasking processing environment on a processing device MCU (microcontroller unit) such that exemplarily described with reference to FIG. 1. The processing device MCU comprises hardware peripherals HW 1 to HW n, which may be one or more of the hardware peripherals described above with reference to FIG. 1.

At point in time between $T_1$ and $T_2$, as long as only one process such as the process 1 is executed in the processing environment, any conflicts do not occur. The hardware peripherals such as HW 1 can manage accesses by the process 1 without any further precautions. There is not risk of conflicting concurrent accesses for different processes.

At point in time between $T_3$ and $T_4$, in case several processes are executed (substantially) in parallel in the processing environment, any conflicts do not occur unless each process only accesses a respective set of hardware peripherals. A respective set comprises hardware peripherals distinct from those in the one or more other sets. Accordingly, each hardware peripheral manages accesses by only one of the processes executed (substantially) in parallel in the processing environment. As exemplarily illustrated, hardware peripheral HW 1 manages exclusively access by process 1 and hardware peripheral HW 2 manages exclusively accesses by process 2. It is well understood that the management of hardware peripheral exclusively dedicated to a process requires software overhead in form of a software management layer.

At point in time between $T_5$ and $T_6$, concurrent accesses of two or more processes executed (substantially) in parallel in the processing environment to the same hardware peripheral require an access management mechanism in order to avoid potential conflicts and race conditions. As exemplarily illustrated, the processes 1 and 2 concurrently access the hardware peripheral HW n, which causes an access conflict and may involve a race condition because the processes depend on a shared state of the concurrently accessed hardware peripheral HW n. In order to prevent such conditions upon shared states, operations have to be mutually exclusive.

In multi-processor systems, semaphores are used to provide a mechanism for preventing concurrent accesses to shared resources (e.g., memory regions). When used properly, semaphores help to ensure that the processors access any particular shared resource serially, rather than concurrently, so that the shared resource may remain coherent.

Semaphores may be implemented in software. More specifically, before a processor accesses (e.g., updates or writes to) a shared resource, the processor is required, by software convention, to determine whether a semaphore associated with the shared resource currently is locked by another processor. If not, the processor may lock the semaphore and access the shared resource, and other processors should avoid concurrent accesses to the shared resource. Only the processor that locked the semaphore may access the shared resource, and only that processor may unlock the semaphore after the access has been completed. Once the semaphore has been unlocked, another processor may attempt to lock the semaphore in order to reserve access to the shared resource.

Semaphores may also be implemented in hardware. For example, a system may include semaphore hardware units (e.g., registers, logic circuitry, and so on). Each of the semaphore hardware units is controlled by software and associatable with a shared resource or memory area. In order to prevent concurrent access to the resource or memory area protected by the hardware semaphore software has to check whether the resource or memory area is locked. In other words, the semaphore needs to be manipulated and then later checked by software in order to establish access protection.

Software and hardware implemented semaphores each have various advantages and disadvantages. For example, although software semaphores may be implemented without extensively modifying the system architecture, implementation of software semaphores places a large computational burden on the processors. In addition, a risk is present that a processor may not properly follow the required semaphore usage protocol, which may lead to non-coherent accesses of shared resources. Proper system operation is guaranteed only when the processors use the semaphores in the correct manner. Failure to follow the required protocols, because of either a programming error or malicious software, may manifest itself in any of a number of error conditions (e.g., data corruption, system hangs, system crashes, and so on). Conversely, hardware semaphores do not typically consume extensive processor resources, and the risk of non-coherent accesses due to processor non-compliance is lower than for only software-implemented semaphores. However, because each semaphore is implemented using specific hardware, the number of hardware semaphores implemented in a system is limited based on the amount of system real estate that may be dedicated to semaphores, routing between the processors and the semaphore hardware, and other considerations. The number of general semaphores, which might be required, is also difficult to predict in particular in case the use case of a hardware is not known in advance. An application might or might not use all of them or none. Even hardware-implemented semaphores require additional software run on the system.

Referring now to FIG. 3, a kind of universal solution to manage concurrent access to shared hardware peripheral is provided by a virtualization software layer such as a hypervisor. As described by the way of introduction, the hypervisor enables the sharing of the peripherals in particular connected to an I/O controller. However, such software based virtualization solutions cause high latencies because the hypervisor has to store and keep track on context information for all executed processes, lock statuses of all peripherals and all interrupts issued by any of the peripherals. Thus sharing of a peripheral with a hypervisor can become a bottleneck in the overall system performance. When there are multiple processes accessing to a shared peripherals, either the processes access the peripherals on a sequential basis or each process is operatively associated to a dedicated peripheral. While sequential accessing of shared peripherals affects the system performance, having dedicated peripherals for each of the processes may add up to the overall cost of the system and increase in the overall power consumption.

In particular, even if only one of the process makes exclusive use of one peripheral, such as process 1 making exclusive use of peripheral HW 1 or process 2 making exclusive use of peripheral HW 2 as schematically illustrated in FIG. 3, the processing overhead of the hypervisor is still present.

In accordance with the present application, a context aware peripheral is suggested. A context aware peripheral comprises a mechanism for managing accesses of one or more shared peripherals. In an example of the present application, the mechanism comprises, for each shared peripheral, a lock status register and a context register. The lock status register is arranged to store a status information indicative of the use status of the peripheral; the status information may be for instance indicate of the state "free" and the state "busy". The status "free" indicates that the peripheral is currently not accessed by any processes and is available to be accessed. The status "busy" indicates that the peripheral is currently accesses by a process to which the peripheral is temporally exclusively allocated. The peripheral is "locked" by a process.

The context register is provided to store context information of the processes, which makes currently use of the peripheral (or which has locked the peripheral).

Figure 4:
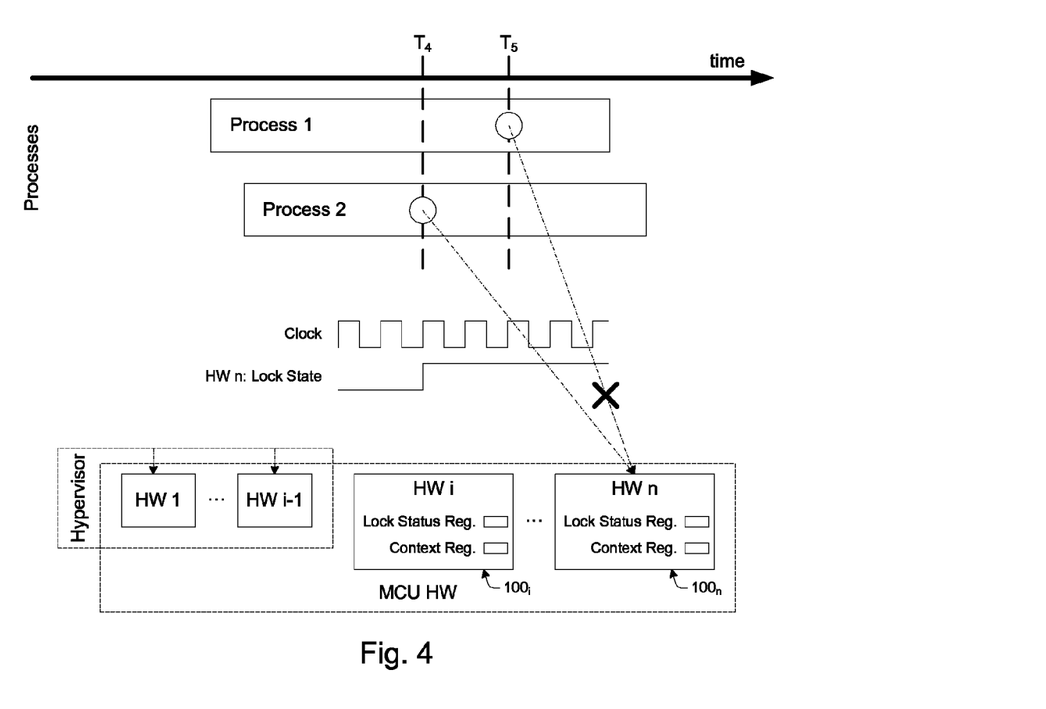
FIG. 4 shows a schematic flow diagram illustrating two processes executed in a multitasking processing environment on a processing device MCU (microcontroller unit) with context-aware shared integrated peripherals in accordance with an example of the present application.

Referring now to FIG. 4, a schematic flow diagram illustrating two processes executed in a multitasking processing environment on a processing device MCU (microcontroller unit) with context aware peripherals ($HW_1$ to $HW_n$) is shown. As exemplarily illustrated in FIG. 4, the process 2 first accesses the peripheral $HW_n$ at a point in time $T_4$ before the process 1 tries to access the peripheral $HW_n$ at a later point in time $T_5$. The first access locks the peripheral $HW_n$ for being exclusively used by the process 2. Upon the first access, the context register is loaded with context information relating to the process 2. The later access by process 2 is rejected because the peripheral $HW_n$ is locked and the access from process 2 does not match with the context information currently stored in the context register.

As schematically illustrated, the mechanism for managing access to a peripheral may be implemented in the peripheral such as schematically shown in FIG. 4 with reference to the peripherals $HW_i$, 100$_1$, to $HW_n$, 100$_n$, reprehensive of a plurality of peripherals each having a mechanism for managing access. The peripherals with mechanisms for managing access may be operated in addition to peripherals $HW_1$ to $HW_{i-1}$, which are managed by a hypervisor enabling shared access thereto.

Figure 5:
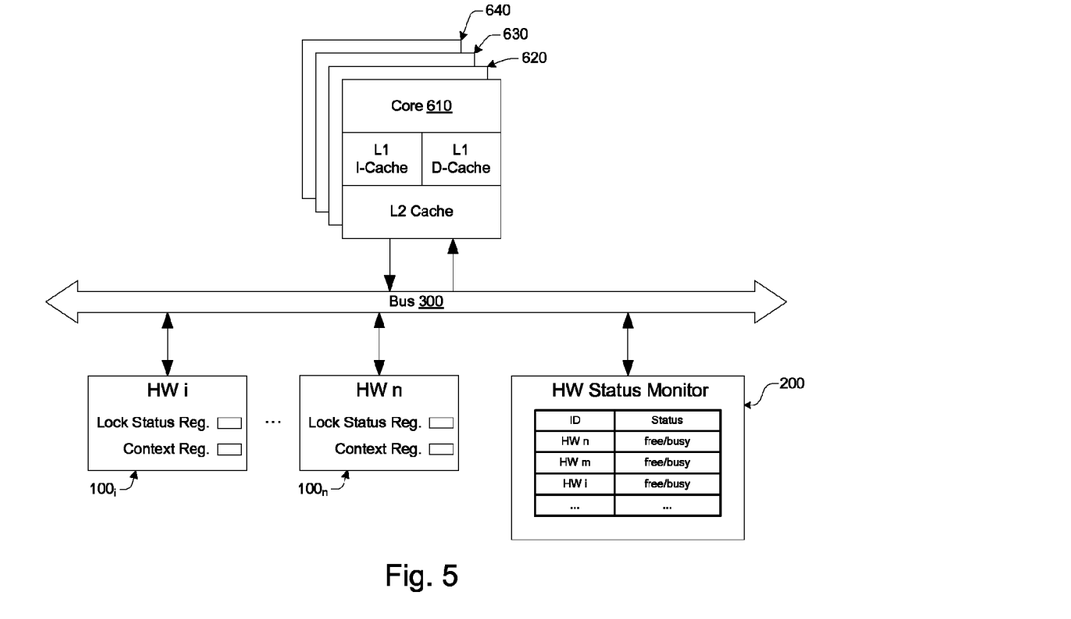
FIGS. 5 to 7 schematically illustrate simplified block diagrams of context-aware shared integrated peripherals according to examples of the present application.
Figure 6:
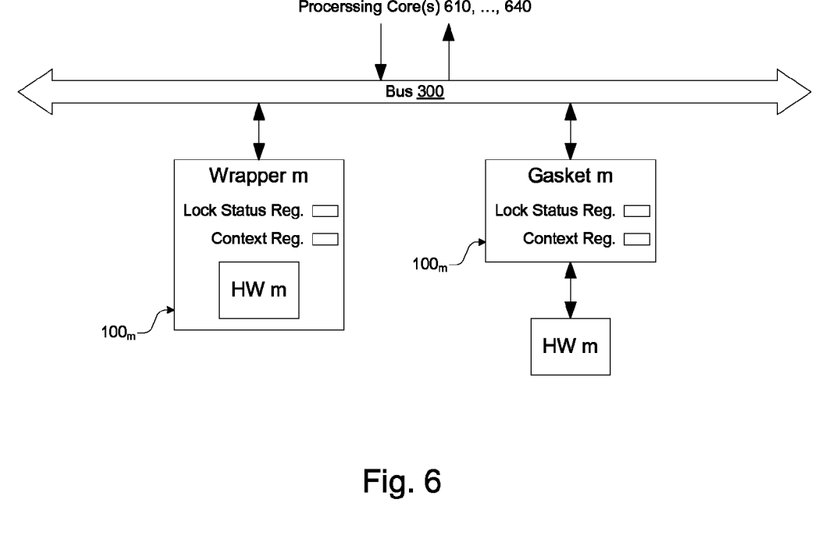
Figure 7:
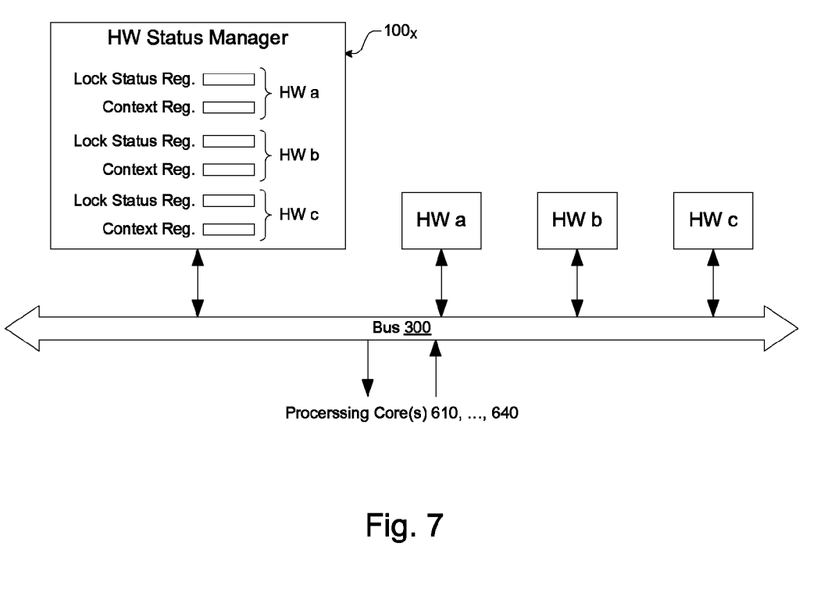

Referring to FIGS. 5 to 7, simplified block diagrams of context-aware shared integrated peripherals according to examples of the present application are schematically illustrated.

In FIG. 5, context-aware shared integrated peripherals HW i to HW n are schematically illustrated. Each of the peripherals $HW_i$, 100$_1$, to $HW_n$, 100$_n$ implements a mechanism for managing access thereto. The peripherals $HW_i$, 100$_1$, to $HW_n$, 100$_n$ are operatively coupled to for instance a bus 300 of the processing device and are configured to communicate through the bus 300 with the one or more processing cores 610 to 640 of the processing device. The bus 300 may be the interconnect bus 650 or one or more peripheral buses connected to the interconnect bus 650 of the processing device 600 via an I/O bridge 670 as described with reference to FIG. 1.

A status monitor 200 may be additionally provided, which collects the status of one or more peripherals with mechanisms for managing access. The status information may be sent from a peripheral with a mechanism for managing access to the status manager upon change of the status or the status manager may retrieve the status information from the peripherals with mechanisms for managing access for instance cyclically or periodically. The status monitor 200 may be system register provided in the processing device.

Referring now to FIG. 6, the mechanism for managing access may be likewise implemented in a wrapper, bridge or gasket 100$_m$, which allows providing an existing implementation of a peripheral to enhance with a mechanism for managing access. The wrapper, bridge or gasket 100$_m$ is provided to interpose logically the mechanism for managing access between the bus 300, via which the peripheral HW m communicates with the one or more processing cores 610 to 640 of the processing device, and the circuitry of the peripheral HW m. Accordingly, communication to the peripheral HW m is passed through the mechanism for managing access. The gasket 100$_m$ may further provide for a translation between communication protocols used on the bus 300 and supported by the peripheral HW m. The bus 300 may be the interconnect bus 650 or one or more peripheral buses connected to the interconnect bus 650 of the processing device 600 via an I/O bridge 670 as described with reference to FIG. 1.

Referring now to FIG. 7, a HW status manager 100$_X$ may be provided, which comprises several mechanisms for managing access to peripherals. Each mechanism for managing access of the HW status manager 100$_X$ is provided for one of the peripherals to be manager, which may be implemented separately in the processing device. The status manager comprises the status registers and context registers for several peripherals HW a, HW b, and HW c and each associated with one of the several peripherals. Any access to the peripherals HW a, HW b, and HW c is routed through the status manager 100$_X$.

Those skilled in the art will understand the a processing system such as the processing device 600 may include one or more of the above described exemplary implementations of a peripheral with a mechanism for managing access thereto. The exemplary implementations schematically illustrated in FIGS. 5 to 7 have been described with reference to several figures for the sake of clarity and intelligibility only. The present application should not be understood to be limited to any exemplary implementation thereof.

Figure 8:
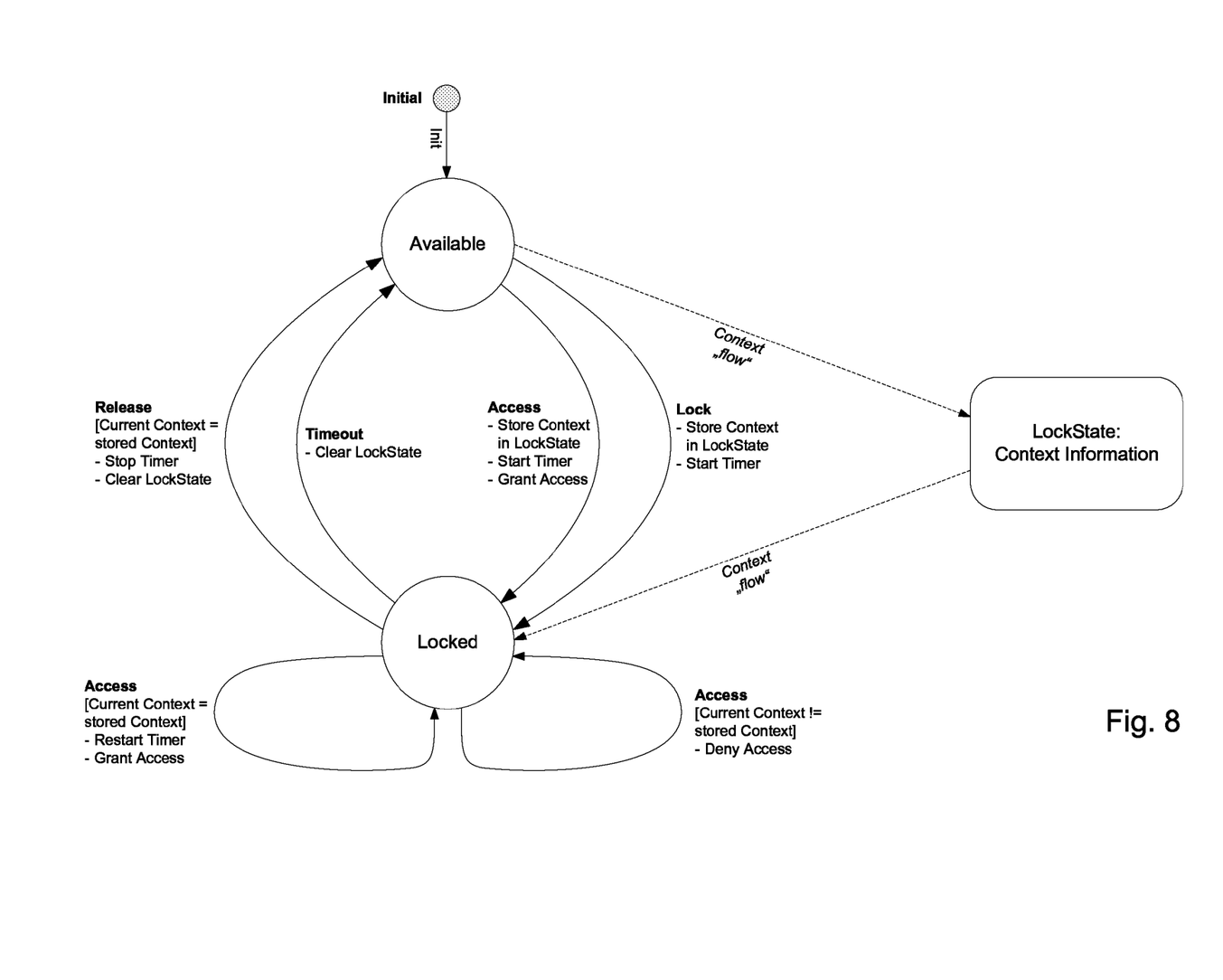
FIG. 8 schematically illustrates a simplified state diagram describing the operation of the mechanism for managing access applicable with a context-aware shared integrated peripheral according to examples of the present application.

Referring now to FIG. 8, the operation of the mechanism for managing access will be described in detail with respect to a state machine diagram schematically illustrating the functional states and transitions between them. The mechanism for managing access comprises an initial state and two operational states.

The initial state is a non-operational state. Upon an initialization, which may be for instance part of a rest procedure, the mechanism for managing access transitions into the operational state "available" (or state "fee").

In the operational state "available" (or state "free"), the peripheral, which access is managed by the mechanism, is available for any application and not being in use or locked by another one.

If the mechanism for managing access is in the operational state "available", any request received thereat from any application is granted. Upon receiving a first access request or a lock request, the operational state transitions into the operational state "locked" (or state "busy", state "in-use"). Further, context information relating to the requesting application is determined and is stored in the context register of the mechanism for managing access. The stored context information relating to the requesting application allows the mechanism being in operational state "locked" to verify whether any further requests originating from the requesting application or any other application. The context information relating from the requesting application may be obtained from the access request or the lock request. An acknowledgement may be sent to the requesting application indicating that access is granted thereto in response to the access/lock request.

In the operational state "locked" (or state "busy") the peripheral, which access is managed by the mechanism, is exclusively available for the application, which has issued or caused the first request or the lock request upon which the operational state has transitioned.

If the mechanism for managing access is in the operational state "locked", any request received thereat from any application is verified against the context information stored at the context register. As long as a received request originates from the application having been granted exclusive use, which is determined by comparing current context information obtained in conjunction with the received request and the stored context information, the request is granted and passed to the peripheral for processing thereat. The current context information may be obtained or extracted from the received request. The context information may comprise an identifier identifying the application or a process, thread or task thereof.

Otherwise, i.e. if the context information of the received request does not comply with the stored context information, the request is denied and not passed to the peripheral for processing thereat. A notification may be sent to the application, the request of which has been denied, to inform thereabout.

The operational state of the mechanism for managing access returns to the state "available" upon a release request issued by the application, to which exclusive use has been granted. The release request is verified against the context information stored at the context register and if the stored context information complies with the context information obtained from the release request, the operational state transitions to state "available" and the context register, which is provided to the context information, is cleared.

The mechanism for managing access may further implement a timer driven release of the locked state. The timer is reset to a predetermined timer value upon receiving a request, which is granted. When the predetermined period of time has elapsed or the predetermined time has expired, the timer forces the mechanism for managing access to transition back into operational state "available". A signal may be generated by the timer indicating the elapsed/expired period. Upon the signal, the mechanism transitions back into operational state "available". For instance, the timer is a watchdog timer, which is restarted/reset upon each granted request and which forces the transition into operational state "available" upon elapsing/expiring. The timer may be configurable by a requesting application to meet individual application and/or use case requirements.

Figure 9:
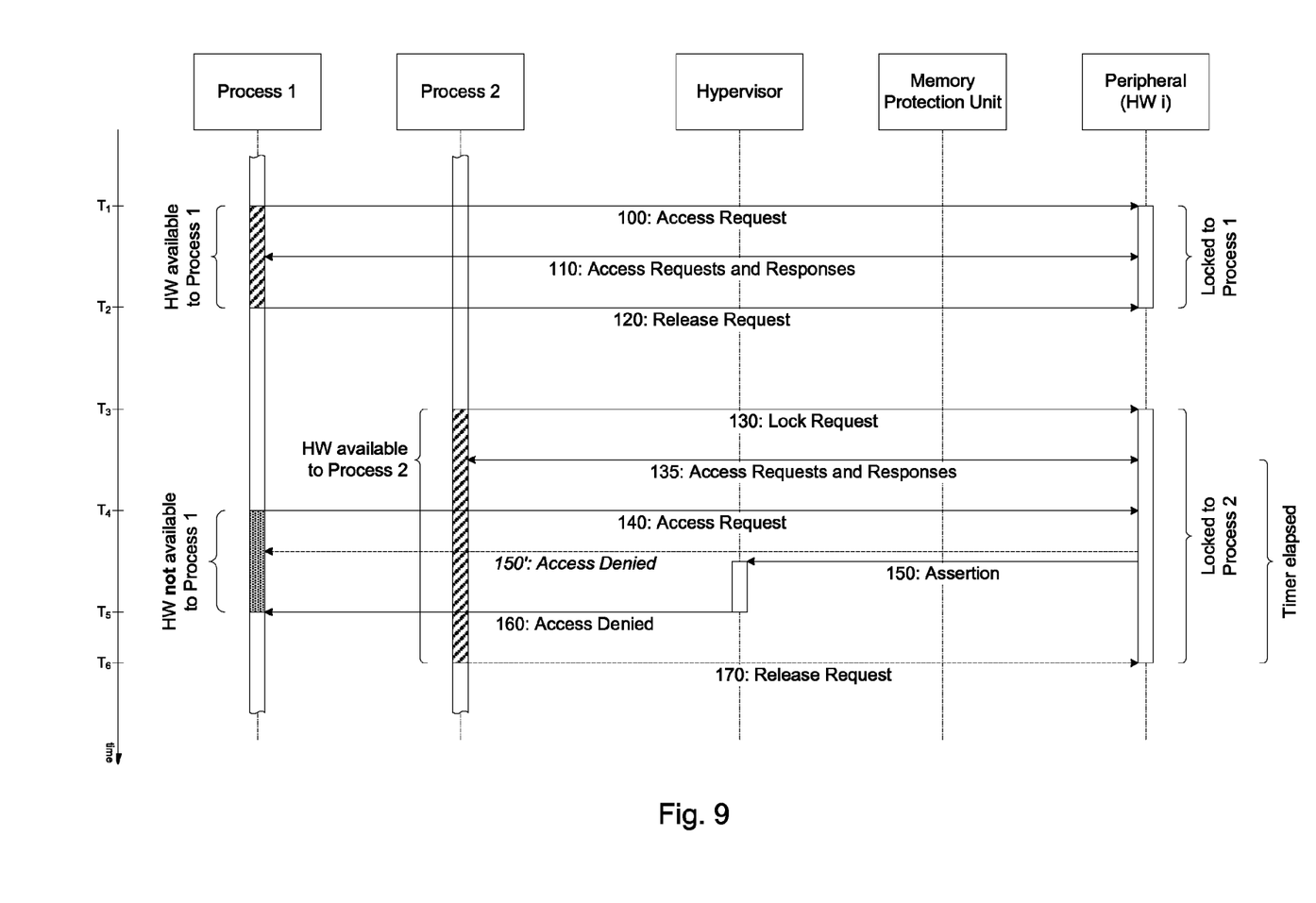
FIG. 9 schematically illustrates the operation of the mechanism for managing access according to an example of the present invention on the basis of an exemplary processing flow with respect to a simplified flow diagram.

The operation of the mechanism for managing access will be further understood on the basis of the exemplary flow diagram shown in FIG. 9 of the present application. The operation will be exemplified with reference to distinct points in time $T_1$ to $T_6$, which should be considered subsequent in time.

Two or more applications are executed in parallel in a multitasking environment at a processing device. The service served by the peripheral $HW_i$ is used by at least the application 1 and application 2, which should be understood as illustrative of a plurality of applications. The peripheral $HW_i$ is provided with a mechanism for managing access to the peripheral $HW_i$ and the services served thereby.

At a point in time $T_1$, the process 1 issues an access request 100 to the peripheral $HW_i$. The mechanism for managing access is in the operational state "available" at that point in time. As described above, the access request of the process 1 is a first access request, upon reception of which the mechanism for managing access of the peripheral $HW_i$ transitions into the operational state "locked" and grants exclusive use of the services of the peripheral $HW_i$ to the process 1. The information about the context in which the first access request has been issued, such as context information relating to the request issuing process 1, is stored in the context register at the mechanism for managing access.

Further access requests 110 issued by the process 1 are passed by the mechanism for managing access validating the requests addressing the peripheral $HW_i$ to the peripheral HW i for being processed thereat. The peripheral $HW_i$ may reply with one or more responses to requests processed thereat. Only requests originating from the process 1 are granted and served by the peripheral $HW_i$. In order to determine the origin of the further access requests 110, the mechanism obtains information about the context, in which the further access requests have been issued, and compares the determined context information with the context information stored in the context register. The information about the context, in which the further access requests have been issued, may be obtained or extracted from the further access requests 110.

At a point in time $T_2$, the process 1 issues a release request 120. The mechanism for managing access being in the operational state "locked" transitions into the operational state "available" in case the release request is a valid or allowable request. The release request 120 is valid or allowable in case the release request has been issued by the process 1, to which exclusive use was granted. In order to determine the origin of the release access requests 120, the mechanism obtains information about the context in which the release requests has been issued and compares the determined context information with the context information stored in the context register. The information about the context, in which the release request has been issued, may be obtained or extracted from the release request 120.

At a point in time $T_3$, the process 2 issues an lock request 100 to the peripheral $HW_i$. The mechanism for managing access is in the operational state "available" at that point in time. As described above, the mechanism for managing access of the peripheral $HW_i$ transitions into the operational state "locked" and grants exclusive use of the services of the peripheral $HW_i$ to the process 2 upon reception of the lock request 130. Context information relating to the process 2 is loaded into the context register. Thereafter, only subsequent requests 135 originating from the process 2 are granted and passed to the peripheral $HW_i$ to be served thereby. Whether or not subsequent access requests originate from the process 2 is determined on the basis of the stored context information. The peripheral $HW_i$ may reply with one or more responses to requests processed thereat.

The process 1 for instance may issue an access request 140 to the peripheral $HW_i$ at the point in time $T_4$. The access request 140 is received by the mechanism for managing access of the peripheral $HW_i$. The mechanism validates the context, in which the access request 135 has been issued, with regard to the stored context information. The validation fails because the exclusive use of the services of the peripheral $HW_i$ has been granted to process 2 before at the point in time $T_3$.

In an example of the present application, a notification 150' informing about the denied access may be sent from the mechanism for managing access to the process 1 in response to the failed validation. In an example of the present application, an assertion message 150 may be sent to a hypervisor executed that the processing device in response to the failed validation. The hypervisor may further sent a notification 160 informing about the denied access to the process 1 in response to the assertion message 150.

At a point in time $T_6$, the process 2 may issues a release request 170. The mechanism for managing access being in the operational state "locked" transitions into the operational state "available" in case the release request is a valid or allowable request. The release request 170 is valid or allowable in case the release request has been issued by the process 2, to which exclusive use was granted, which is verified on the basis of the stored context information and the information about the context in which the release requests has been issued.

In an example of the present application, the transition of the state of the mechanism for managing access from operational state "locked" to the operational state "available" may be also forced by a watchdog timer upon elapsing of a predetermined period of time.

Figure 10:
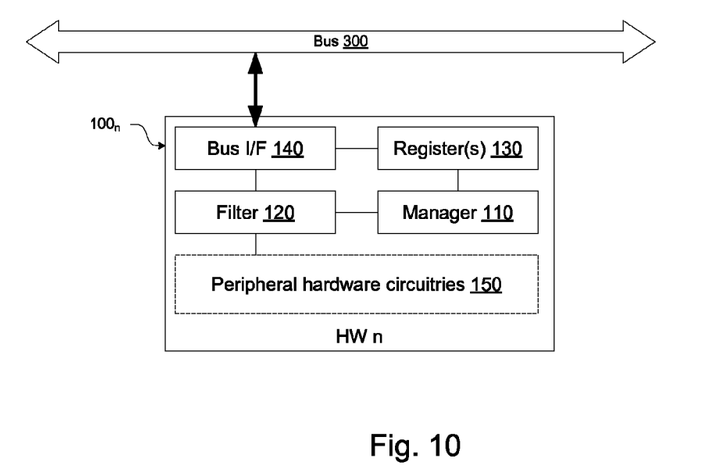
FIG. 10 shows a schematic block diagram of a mechanism for managing access to a shared integrated peripheral according to examples of the present application.

Referring now to FIG. 10, a schematic block diagram of a mechanism for managing access to a shared integrated peripheral will be described with respect to further examples of the present application. For the sake of explanation, the mechanism for managing access will be described as being part of the integrated peripheral. Those skilled in the art will understand on the basis of the below explanation and the teaching of the present application that the below description is not limited thereto but relates also to the further implementations in form of a wrapper/bridge/gasket $100_m$ and a status manager $100_X$ referred to above with reference to FIGS. 5 to 7.

The exemplary mechanism $100_n$ for managing access to at least one shared integrated peripheral HW n of a processing unit is operative in one of at least two operational states comprising an available state, also referred to a state available or state free, and a locked state, also referred to as state locked or state in-use or state busy.

The mechanism $100_n$ comprises at least one context register 130 for storing context information and a bus interface 140 for receiving a request communicated via a bus 300 to the integrated peripheral of the processing device. The bus interface 300 may be a separate bus interface of the mechanism or may be the bus interface of the integrated peripheral.

The mechanism $100_n$ further comprises a managing unit 110 operably coupled to the bus interface and a filtering unit 120 operably inter-coupled between the bus interface and one or more circuitries 150 of the integrated peripheral and further operably coupled to the managing unit 110, The filtering unit 120 is arranged to obtain information relating to a context of the received request. The managing unit 110 operates selectively in accordance with the operative state of the mechanism. In case the mechanism $100_n$ is in the available state, the managing unit 110 is arranged to load the context register 130 with the obtained context information and to grant access in response to the received request. In case the mechanism is in the locked state, the managing unit 110 is arranged to detect whether the obtained context information matches with the context information stored in the context register 130, and if the obtained and stored context information match, to grant access in response to the received request.

In an example, the request is one of at least an access request, a lock request and a release request. The managing unit 110 is further arranged to cause a transitioning of the operative state from the available state to the locked state in case of granted access in response to the received request being one of a first access request or a lock request. The managing unit 110 is further arranged to cause a transitioning of the operative state from the locked state to the available state in case of granted access in response to the received request being a release request.

In an example, the received request is a release request, in accordance with which the managing unit 110 is arranged to clear the context register 130 if the access has been granted.

In an example, the received request is a forced release request, in accordance with which the managing unit 110 is arranged to clear the context register 130 independently of whether the obtained and the stored context information match.

In an example, the managing unit 110 is arranged to discard the received request in case the obtained and stored context information do not match.

In an example, the managing unit 110 is arranged to issue a notification in case the obtained and stored context information do not match. The notification may be sent to the process, which has sent the received request.

In an example, the received request is an access request. The filtering unit is further arranged to forward the received request to one or more circuitries of the integrated peripheral to be processed thereat in case of granted access.

In an example, the mechanism $100_n$ further comprises a timer (not shown) operably coupled to the managing unit 110. The managing unit 110 is further arranged to reset the timer in response to granting the received request.

In an example, the timer is further arranged to issue a signal to the managing unit 110 upon elapsing of the timer. Upon receiving the signal, the managing unit 110 is further arranged to clear the context register.

In an example, the mechanism $100_n$ is in available state in case the context register 130 is cleared and in locked state in case the context register is loaded with context information.

In an example, the mechanism $100_n$ further comprises at least one state register 130 for storing the operational state of the mechanism $100_n$. The state register 130 is readable via the bus interface such that application carried out on the processing device are able to retrieve an information about the current operative state of the mechanism $100_n$.

In an example, the mechanism $100_n,100_X$ further comprises a plurality of context registers 130, each of which is operatively associated with one of several integrated peripherals (cf. HW a to HW c of FIG. 7). The mechanism maintains an operative state for each of the several integrated peripherals.

The received request relates to one of the several integrated peripherals. The received request may be addressed to one specified integrated peripheral or the received request may be dedicatedly related to one specified integrated peripheral (e.g. a lock or release request specifically related to one integrated peripheral).

The filtering unit 120 is further arranged to determine the integrated peripheral (HW a to HW c), to which the received request relates, and to determine the context register, with which the determined context register is associated.

If the operative state relating to the determined integrated peripheral is in the available state, the managing unit 110 is further arranged to load the determined context register with the obtained context information. The operative state relating to the determined integrated peripheral transitions from the available state to the locked state. The managing unit 110 is arranged to grant access to the determined peripheral (HW a to HW c) in response to the received request.

If the operative state relating to the determined integrated peripheral is in the locked state, the managing unit 110 is further arranged to detect whether the obtained context information matches with the context information stored at the determined context register 130 (associated with the integrated peripheral, to which the received request relates). If the obtained and context information stored in determined context registers 130 match, the managing unit 110 is further arranged to grant access to the determined integrated peripheral (HW a to HW c) in response to the received request.

In an example, the mechanism $100_n, 100_X$ further comprises a plurality of status registers 130, each of which is operatively associated with one of several integrated peripherals (cf. HW a to HW c of FIG. 7).

Figure 11:
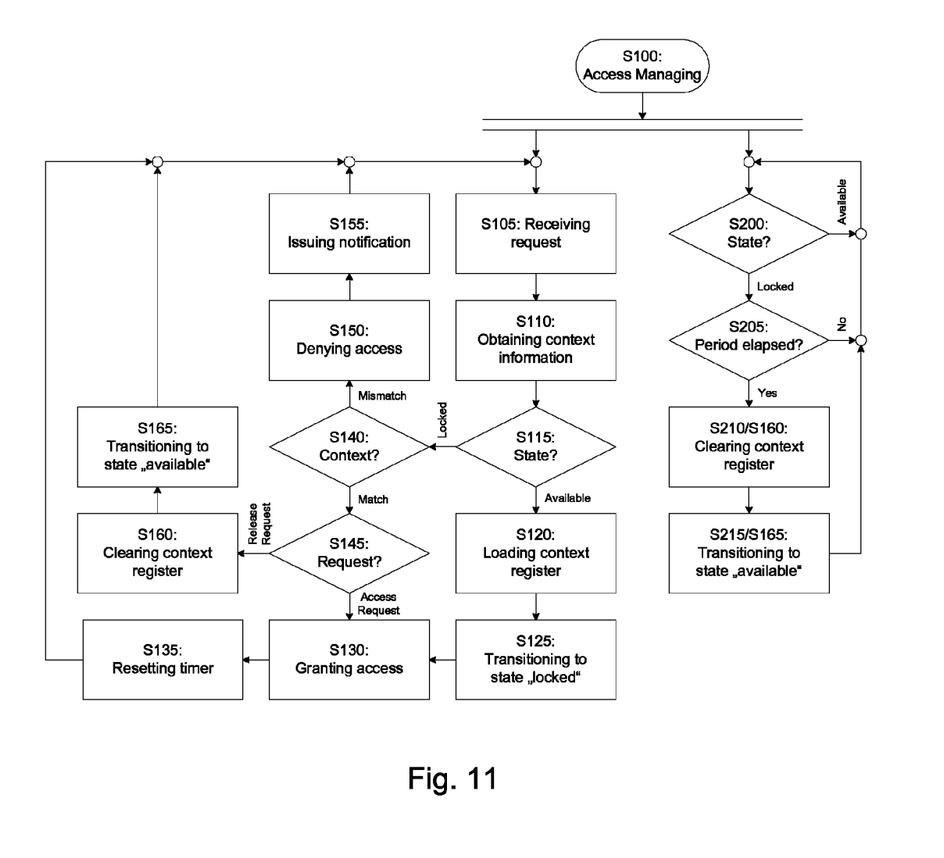
FIG. 11 illustrating a schematic flow diagram relating to the operation of a mechanism for managing access to a shared integrated peripheral with respect to examples of the present application.

In an example, a status register may be provided at the processing unit, which collects information about the operative states of several shared integrated peripherals, which are controlled by one or more mechanisms for managing access thereto. For instance, the managing unit 130 may report each transition of the state to the status register. Accordingly, the status register allows for retrieving information about the current The above description with reference to FIG. 10 will be more fully understood on the basis of the following description referring to FIG. 11 illustrating a schematic flow diagram relating to the operation of a mechanism for managing access to a shared integrated peripheral with respect to further examples of the present application. It should be understood that the description referring to FIG. 11 supplements the above description, in particular the description relating to FIGS. 5 to 10.

In particular, FIG. 11 shows a schematic flow diagram of a method of operating a mechanism $100_n$ for managing access, S100, to a shared integrated peripheral HW n of a processing unit 600. In S105, a request is received, which is communicated via a bus to the integrated peripheral of the processing device. The request may be received by the bus interface 140. In S110, information relating to a context of the received request is obtained. The information relating to the context of the received request, also denoted as context information, may be obtained by the filtering unit 120.

The mechanism $100_n$ is operative in one of at least two operation states comprising an available state and a locked state.

In S115, the state is checked, e.g. by the managing unit 110. If the operative state is the available state, the obtained context information is loaded into or stored in the context register 130, in S120, e.g. by the managing unit 110. In conjunction with or in response to the storing of the obtained context information in the context register 130, the operative state of the mechanism transitions from the available state to the locked state, in S125. The transitioning may be caused or instructed by the managing unit 110. Further, the access is granted in response to the received request, in S130, e.g. by the managing unit 110.

The received request may be a lock request or an access request. A lock request is a request dedicated to request exclusive access to the integrated peripheral by a process. A response may be issued to the requesting process upon granted access. An access request is a request dedicated to request one or more services served by the integrated peripheral. Upon granted access, the access request may be forwarded to the integrated peripheral, in particular by the filtering unit 130 to the circuitries 150 of the integrated peripheral.

If the operative state is in the locked state, the obtained context information is compared with the context information stored in the context register 130, in S140, e.g. by the managing unit 110. The managing unit 110 may retrieve the stored context information from the context register 140. If the obtained and the stored context information match with each other, access is granted in response to the received request, in S130.

The received request may be a release request or an access request. Upon granted access, the access request may be forwarded to the integrated peripheral, in particular by the filtering unit 130 to the circuitries 150 of the integrated peripheral. The release request is a request dedicated to request termination of the exclusive access to the integrated peripheral by a process. In S145, it is checked whether the received request with matching context information is an access request or a release request. If the received request is a release request, the context register is cleared, in S160. In conjunction with or in response to the clearing of the context information stored in the context register 130, the operative state of the mechanism transitions from the locked state to the available state, in S165. The transitioning may be caused or instructed by the managing unit 110. A notification may be issued, e.g. by the managing unit 110, informing about the successful release/termination of the exclusive access.

In a further example, the received request may be a forced release request, which is a request dedicated to request termination of the exclusive access to the integrated peripheral by a process. In case of a received forced release request, the check whether the received request with matching context information is an access request or a release request is omitted. Independently of whether the received and stored context information match, the forced release request causes a clearing of the context register, e.g. by the managing unit 130, and a transitioning of the operative state from the locked state to the available state. In addition, the context obtained in response to the forced release request may be checked to detect whether the forced release request has been issued with privileged rights. Only forced release requests issued under privileged rights may be accepted.

If the operative state is in the locked state and further the obtained and the stored context information do not match with each other, the access is denied, in S150. A notification informing about the denied access may be issued and sent to the process, which has sent the received request, in S155. Further, the received request may be discarded.

In another example, the mechanism for managing access to shared integrated peripherals comprises a plurality of context registers 130. Each of the context registers is operatively associated with one of several integrated peripherals (HWa to $HW_c$). The received request relates to one of the several integrated peripherals. The mechanism maintains an operative state for each of the several integrated peripherals.

Upon receiving a request, the integrated peripheral ($HW_a$ to $HW_c$) out of the several integrated peripherals managed by the mechanism is determined, to which the received request relates and further the context register out of the plurality of context registers is determined, with which the determined context register is associated.

If the operative state relating to the determined integrated peripheral is in the available state, the determined context register is loaded with the obtained context information. The operative state relating to the determined integrated peripheral transitions from the available state to the locked state. Access is further granted to the determined peripheral ($HW_a$ to $HW_c$) in response to the received request.

If the operative state of the mechanism relating to the determined integrated peripheral is in the locked state, it is detected whether the obtained context information matches with the context information stored at the determined context register 130. If the obtained and context information stored in one of the context registers (130) match, access is further granted to the determined integrated peripheral ($HW_a$ to $HW_c$) in response to the received request.

The above-described flow of operation should be understood to be performed upon each request received by the mechanism for managing access to a shared integrated peripheral.

In an example, the mechanism for managing access to a shared integrated peripheral may comprise a timer or watchdog timer. The timer may be reset to a predefined period of time in response to a granted access, in S135. In case the mechanism is in locked state, the timer is regularly checked, whether the predetermined period has elapsed or not, in S205. In case the period has elapsed, the timer has not been reset over this predetermined period. This means that there has not been received any request within the predefined period or one or more request have been received within the predefined period but the mechanism has not granted access in response to the one or more received requests.

In response to the elapsed predefined period, the context register is cleared, in S210, and the operative state of the mechanism transitions from the locked state to the available state, in S220. For instance, the timer may generate and issue a state reset signal indicative of the event of the elapsed predefined period. Upon reception of the state reset signal, the managing unit 130 may clear the context register and/or cause the transitioning of the operative state from locked state to available state.

From the above description, it is understood that the suggested managing of accesses to shared integrated peripherals does not require an interaction with a hypervisor to manage accesses from several processes to the same integrated peripheral. Hypervisor activity involves time-consuming operations such as task switches, context switches and memory copy operations at the processing unit. Omitting the interaction with a hypervisor or bypassing a hypervisor saves the processing resources and processing time, which would be otherwise required thereby. In addition, the access control is shifted to the managed integrated peripherals. The mechanism for managing access to a shared integrated peripheral allows protecting from potential integrity corruption thereof due to concurrent accesses from separate processes without the necessity to implement hardware virtualization.

The implementation of a timer or watchdog timer enables to avoid persistent locking of an integrated peripheral for instance in response to software exceptions (e.g. a malfunctioning process, a crashed process, a process operating in an infinite loop, a stalled process etc.). The timer ensures that the integrated peripheral is available again at the latest after expiry of a predefined period of time, which may be configurable to meet differing requirements of processes.

In the foregoing specification, the invention has been described with reference to specific examples of embodiments of the invention. It will be, however, evident that various modifications and changes may be made therein without departing from the broader spirit and scope of the invention as set forth in the appended claims.

The connections as discussed herein may be any type of connection suitable to transfer signals from or to the respective components, nodes, units or devices, for example via intermediate components. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. In addition, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between blocks are merely illustrative and that alternative embodiments may merge blocks or circuit elements or impose an alternate decomposition of functionality upon various blocks or circuit elements. Thus, it is to be understood that the implementation depicted herein are merely exemplary, and that in fact many other implementation can be designed which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Also for example, in one embodiment, the illustrated examples may be implemented as circuitry located on a single integrated circuit or within a same device.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A shared integrated peripheral of a processing unit, the shared integrated peripheral comprising a mechanism for managing access to the shared integrated peripheral, wherein the mechanism is operative in one of at least two operational states comprising an available state and a locked state, wherein the mechanism comprises:
    at least one context register for storing context information;
    a lock status register;
    a bus interface for receiving a request communicated via a bus to the integrated peripheral of the processing device;
    a managing unit; and
    a filtering unit operably inter-coupled between the bus interface and one or more circuitries of the integrated peripheral and further operably coupled to the managing unit, wherein the filtering unit is arranged to obtain context information relating to a context of the received request;
    wherein the managing unit is arranged to
    if the operative state of the mechanism is in the available state as indicated by the lock status register:
        load the context register with the obtained context information, and
        grant access in response to the received request; and
    if the operative state of the mechanism is in the locked state as indicated by the lock status register:
        detect whether the obtained context information matches with the context information stored in the context register; and
        if the obtained and stored context information match, grant access in response to the received request.

2. The shared integrated peripheral of claim 1, wherein the request is one of at least an access request, a lock request and a release request;
    wherein the managing unit is further arranged to
        cause a transition of the operative state from the available state to the locked state in case of granted access in response to the received request being one of a first access request or a lock request; and
        cause a transition of the operative state from the locked state to the available state in case of granted access in response to the received request being a release request.

3. The shared integrated peripheral of claim 1, wherein the received request is a release request, in accordance with which the managing unit is arranged to clear the context register upon granted access.

4. The shared integrated peripheral of claim 1, wherein the managing unit is arranged to
    discard the received request in case the obtained and stored context information do not match.

5. The shared integrated peripheral of claim 4, wherein the managing unit is arranged to
    issue a notification in case the obtained and stored context information do not match.

6. The shared integrated peripheral of claim 1, wherein the received request is an access request,
    wherein the filtering unit is further arranged to
        forward the received request to one or more circuitries of the integrated peripheral to be processed thereat in case of granted access.

7. The shared integrated peripheral of claim 1, further comprising:
    a timer operably coupled to the managing unit,
    wherein the managing unit is further arranged to
        reset the timer in response to granting the received request.

8. The shared integrated peripheral of claim 7, wherein the timer is further arranged to
    issue a signal to the managing unit upon elapsing of a predefined period of time;
    wherein the managing unit is further arranged to
        clear the context register upon receiving the signal.

9. The shared integrated peripheral of claim 1,
    wherein the mechanism is in available state in case the context register is cleared; and
    wherein the mechanism is in locked state in case the context register is loaded with context information.

10. The shared integrated peripheral of claim 1, further comprising:
    at least one state register for storing the operational state of the mechanism, wherein the state register is readable via the bus interface.

11. A method of operating a mechanism for managing access to a shared integrated peripheral of a processing unit, wherein the mechanism is located in the shared integrated peripheral and is operative in one of at least two operation states comprising an available state and a locked state, wherein the method comprises:
    receiving a request communicated via a bus to the integrated peripheral of the processing device,
    obtaining information relating to a context of the received request;
    if the operative state of the mechanism is in the available state as indicated by a lock status register of the mechanism,
        loading a context register for storing context information with the obtained context information, wherein the operative state of the mechanism transitions from the available state to the locked state; and
        granting access in response to the received request; and if the operative state of the mechanism is in the locked state as indicated by the lock status register of the mechanism,
    detecting whether the obtained context information matches with the context information stored in the context register; and
    if the obtained and stored context information match, granting access in response to the received request.

12. The method of claim 11, wherein the request is one of at least an access request, a lock request and a release request, the method further comprising:
    transitioning of the operative state from the available state to the locked state in case of granted access in response to the received request being one of a first access request or a lock request; and
    transitioning of the operative state from the locked state to the available state in case of granted access in response to the received request being a release request.

13. The method of claim 11, further comprising:
    clearing the context register upon granted access if the received request is a release request.

14. The method of claim 11, further comprising:
    discarding the received request in case the obtained and stored context information do not match.

15. The method of claim 11, further comprising:
    forwarding the received request to one or more circuitries of the integrated peripheral to be processed thereat in case of granted access if the received request is an access request.

16. The method of claim 11, further comprising:
    resetting a timer to a predefined period of time in response to granting the received request.

17. The method of claim 16, further comprising:
    generating a signal upon elapsing of a predefined period of time as indicated by the timer; and
    clearing the context register upon receiving of the signal.

18. A system comprising a hardware status manager for managing access to a first shared peripheral and for managing access to a second shared peripheral, the first shared peripheral, the first shared peripheral and the hardware status manager connected to a bus connected to a processor, the hardware status manager comprising a first lock status register and a first context register corresponding to the first shared peripheral, and a second lock status register and a second context register corresponding to the second shared peripheral, wherein in response to receiving a first request directed to the first shared peripheral and associated with first context information,
    if an operative state of the first shared peripheral is in an available state as indicated by the first lock status register:
        load the first context register with the first context information, and
        grant access in response to the first request; and
    if the operative state of the first shared peripheral is in the locked state as indicated by the lock status register:
        detect whether the first context information matches with context information stored in the first context register; and
        if the first context information matches with the context information stored in the first context register, grant access to the first shared peripheral in response to the first request.

19. The system of claim 18, further comprising the first shared peripheral and the first shared peripheral.

20. The system of claim 18, wherein in response to receiving a second request directed to the second shared peripheral and associated with second context information,
    if an operative state of the second shared peripheral is in an available state as indicated by the second lock status register:
        load the second context register with the second context information, and
        grant access in response to the second request; and
    if the operative state of the second shared peripheral is in the locked state as indicated by the lock status register:
        detect whether the second context information matches with context information stored in the second context register; and
        if the second context information matches with the context information stored in the second context register, grant access to the second shared peripheral in response to the second request.

* * * * *